UNITED STATES PATENT OFFICE 2,657,214

CHLOROMETHYL DERIVATIVES OF INDIGOS

David I. Randall, Easton, Pa., assignor to General Aniline & Film Corporation, New York, N. Y., a corporation of Delaware No Drawing. Application February 10, 1951,
Serial No. 210,428

6 Claims. (Cl. 260—324)

This invention relates to the production of halogenmethyl derivatives of indigos and the quaternary salts thereof.

Indigos have long been known as valuable vat dyes and indigo itself is known to be the cheapest and largest selling of vat dyes of any class. They are insoluble in aqueous and spirit solutions and, therefore, cannot be applied substantively to fabrics. They derive their dyeing properties from their capacity of passing into solution as "leuco" compounds when reduced with alkaline agents. Such alkaline treatment converts the insoluble dye to a phenolic form by reduction of one or more of the keto groups of the indigo molecule which has the following configuration:

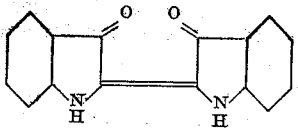

Alkaline solutions of the reduced compounds possess a considerable affinity for cotton fiber and have the property of being readily reoxidized on treatment by air with the precipitation of the original dyestuff.

Although this method produces a fast bond between the dye and the fiber due to the thorough impregnation of the fiber with the "leuco" or reduced form of the dye and precipitation of the dye on the fiber during oxidation, it is obviously subject to limitations. Fabrics which are affected by alkali cannot be easily dyed by this method. Thus, in wool dyeing it is necessary to neutralize the "leuco" or reduction solution. Some methods for effecting that result have been proposed, but have not been successfully employed. A more successful approach has been the use of leuco esters of the indigo dyes. Other problems requiring carefully controlled conditions and special equipment and the use of boosters are also inherent in the process of dyeing from leuco vats.

It is, therefore, an object of this invention to produce or convert indigos into a form which can be used directly as a dye or dye intermediate. It is a further object of this invention to produce derivatives of indigos which do not require alkaline solutions for dyeing.

With these and other objects in mind it has now been discovered that indigo and its halogen and alkyl derivatives, as represented by the structural formula

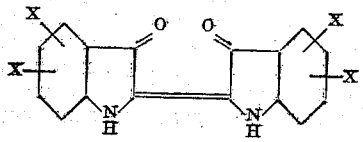

where the X's represent hydrogen, alkyl or halogen, may be converted to valuable dyes by first producing the halomethyl, particularly the chloromethyl derivatives of the indigo compound, and reacting this with quaternizing agents to produce the quaternary salts of these halomethyl derivatives.

The chloromethyl derivatives are produced by dissolving the indigo compound, for instance indigo itself, or 4,4'-dichloro indigo, in a solvent for the reactants, specifically concentrated sulfuric acid of at least 95% $H_2SO_4$, and preferably 100% $H_2SO_4$, then introducing bis-chloromethyl ether at temperatures of from 0° C. to 30° C. for several hours. In the case of indigo, monochloromethylation is effected at 0° C. in 100% $H_2SO_4$ when the reaction is run for two hours. Dichloromethylation takes place in the case of the dichloro indigo at room temperature when the reaction is run for seven hours. Increasing the temperature and the duration of the reaction does not increase the number of entering chloromethyl groups in either case.

The chloromethylated indigos are relatively insoluble, but are converted to water-soluble quarternary salts by reaction with a quaternizing agent, such as a thiourea compound producing the isothiouronium quaternary salts of the chloromethylated indigo and a tertiary amine producing the N-methylene quaternary salts of the chloromethylated indigo. The reaction is produced by heating the chloromethylated indigo compound in a paste form with the quaternizing agent over a steam bath with additions of water and frequent stirring for a period of approximately one hour, and then diluting the reaction mixture with acetone and water, filtering and slurrying or washing with acetone. The reaction proceeds in accordance with one of the following equations:

(1)

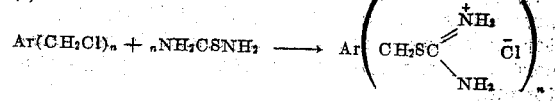

(2)

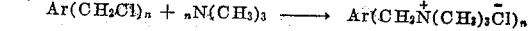

where Ar is the radical of indigo or a halogen indigo and $n$ is one of the integers 1 and 2. The thiourea in Equation 1 may be replaced by thiourea derivatives such as 1-allyl thiourea, 1-methyl thiourea, 1-phenyl thiourea, 1,3-dimethyl thiourea, 1,3-ethylene thiourea, 1,1,3-trimethyl thiourea, and 1,1,3,3-tetramethyl thiourea. The trimethylamine may be replaced by other tertiary amines such as piperidine, picoline, isoquinoline, quinoline, diethylaminoethyl alcohol, triethylamine, and benzyldimethylamine.

The quaternary salts derived from trimethyl and tetramethyl thiourea are the more soluble and, to insure sufficient solubility, it is necessary that the halogenmethylated indigo compound contain an average of at least one halogenmethyl group. Prints made from the quaternary salts of the chloromethylated indigos exhibit bright shades of from blue to green which possess excellent fastness to chlorine, washing, and light. These quaternary salt dyes, being water soluble, may be used to dye paper pulp, cotton, silk, nylon, and wool. They may also be paste printed on cotton, silk, and nylon and developed by vat or acid aging methods well known to the art. The isothiouronium quaternary salts of the indigos may be represented by the formula

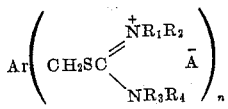

wherein Ar is the radical of an indigo or halogen indigo compound; $R_1$, $R_2$, $R_3$, and $R_4$ are members of the group consisting of alkyl, alkylene, aryl, and hydrogen, of which $R_2$ and $R_4$ may together form a closed ring system; $n$ is one of the integers 1 and 2; and A indicates a negative ion such as chlorine, bromine, or sulfate.

The N-methylene quaternary salts of the chloromethylated indigos may be represented by the formulae (1) 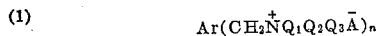

(2) 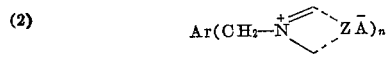

wherein Ar has the same meaning as above; $Q_1$, $Q_2$, and $Q_3$ are members of the group consisting of alkyl, alkylol, and alkaryl; Z indicates the C atoms necessary to complete a six-membered ring system; A and $n$ have the same meanings as above.

The following examples will serve to further illustrate this invention and are presented as illustrative of the best manner of performing the invention and not as limitations on its scope. Unless otherwise stated, parts are by weight.

EXAMPLE 1

*Monochloromethyl indigo*

12 gr. of indigo powder are added slowly to a stirred solution of 16.0 cc. of bis-chloromethyl ether and 80 cc. of 100% sulfuric acid, held at 0° C. by an ice and salt bath.

The solution is stirred for two hours at 0° C. and poured over ice. After stirring briefly, the formed finely-divided blue solid is filtered, washed neutral, and dried. The weight of the product is 14.7 gr. Chlorine calculated 11.4% for monochloromethylation, found 9.0%. Accordingly, the product of this reaction has the formula

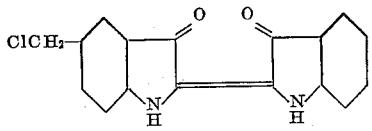

EXAMPLE 2

*Bis-chloromethyl 4,4'-dichloro indigo*

12 gr. of 4,4'-dichloro indigo are introduced into a solution of 16.0 cc. bis-chloromethyl ether in 70 cc. 100% sulfuric acid at 10° C. The solution is stirred for seven hours at room temperature, poured over ice, stirred briefly, and the formed finely-divided blue solid filtered, washed neutral, and dried. The chlorine content calculated is 33.2% for bis-chloromethylation; found 28.2%. Accordingly, the product of this reaction has the formula

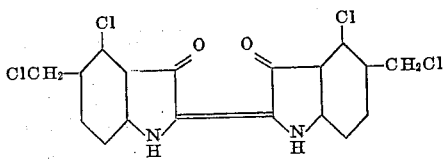

The presence of the two symmetrical halogen atoms stabilizes this indigo compound to substitution reactions, and in the chloromethylation reaction two chloromethyl groups may readily be introduced without any polymer formation taking place.

EXAMPLE 3

400 cc. of water, 70 gr. of trimethyl thiourea, and 120 gr. of the monochloromethyl indigo obtained in Example 1 are heated on a steam bath for one hour. The isothiouronium salt of the monochloromethyl indigo forms rapidly and a thick paste is obtained. The product is isolated by dilution with acetone, filtration, trituration of the precipitate several times with acetone, refiltering, and drying. A water-soluble blue-green salt is obtained which when printed on cotton yields attractive blue shades considerably greener than may be obtained from indigo by the vatting processes mentioned above. The isothiouronium salt product has the following formula:

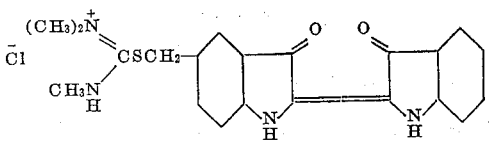

EXAMPLE 4

A suspension of 80 cc. water and 20 gr. monochloromethyl indigo, obtained in accordance with Example 1, is heated on a steam bath and 25.0 gr. of thiourea are added. After one hour heating the reaction is completed and the resulting dark blue paste is poured into 400 cc. of water, stirred, and filtered. To the filtrate one liter of acetone is added to precipitate the isothiouronium salt. It is filtered and dried, the weight being 20 gr. The solubility of this compound is somewhat less than that of the trimethyl isothiouronium salt of Example 3, but its method of application to cotton is the same. It has the following structural formula:

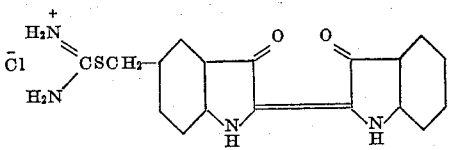

EXAMPLE 5

A solution of 5 liters of pyridine containing 500 gr. of the monochloromethyl indigo obtained in accordance with Example 1 is warmed at 80° C. for 48 hours. This heating period is sufficient for complete precipitation of the pyridinium chloride. By filtering and washing with acetone to remove pyridine, 450 gr. of a blue water-soluble compound are obtained. Warming with an aqueous base decomposes the compound, leaving a brown precipitate. The product has the following structural formula:

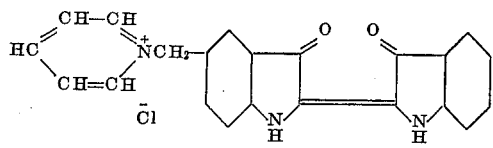

Quinoline, picoline, and other tertiary amines may be used equally as well as pyridine in this example.

EXAMPLE 6

300 gr. of dichloromethyl-4,4'-dichloro indigo as produced in Example 2 and 250 gr. of dimethyl thiourea are heated at 90–100° C. for one hour on a steam bath. The product is isolated by dilution of acetone, filtration, trituration of the precipitate several times with acetone, refiltering, and drying. 300 gr. of a blue dimethyl isothiouronium salt of the dichloromethyl-4,4'-dichloro indigo are obtained. The product is water soluble and may be printed on cotton goods by the usual methods to form bright blue shades of good light and wash fastness and fastness to chlorine. The product has the following structural formula:

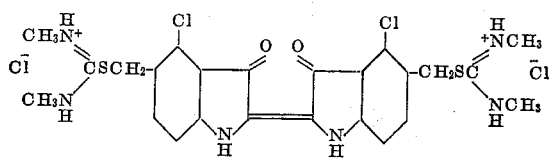

5-bromoindigo, 7,7'-dimethylindigo, 5,5',7,7'-tetrabromoindigo, 5,5'-dichloro-7,7'-dimethylindigo and the like may be chloromethylated as in Examples 1 and 2 and the resultant compounds converted to water-soluble quaternary salts by treatment with an appropriate thiourea (as in Examples 3 and 4) or a tertiary amine (as in Examples 5 and 6).

I claim:

1. A chloromethyl-substituted indigo compound of the formula

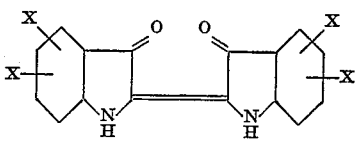

wherein X is a member of the group consisting of hydrogen, alkyl and halogen and wherein at least one chloromethyl group is substituted on the aryl moiety of the indigo molecule.

2. A chloromethyl-substituted indigo compound of the formula

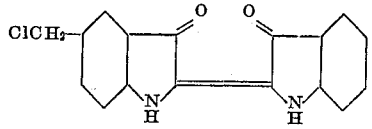

3. A chloromethyl-substituted indigo compound of the formula

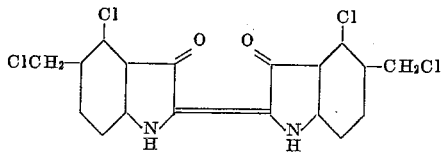

4. A process for the preparation of the chloromethyl-substituted indigo compound which comprises reacting an indigo compound of the formula

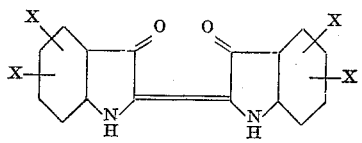

wherein X is a member of the group consisting of hydrogen, alkyl and halogen with bis-chloromethyl ether at 0 to 30° C. in concentrated sulfuric acid.

5. A process as defined in claim 4 wherein the indigo compound is indigo having the formula

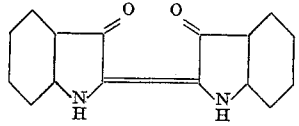

6. A process as defined in claim 4 wherein the indigo compound is 4,4'-dichloro indigo having the formula

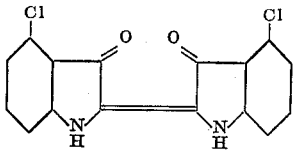

DAVID I. RANDALL.

References Cited in the file of this patent
UNITED STATES PATENTS

| Number | Name | Date |
| --- | --- | --- |
| 2,561,510 | Hess | July 24, 1951 |